Patented Oct. 9, 1945

2,386,586

UNITED STATES PATENT OFFICE 2,386,586

MANUFACTURE OF ACRYLONITRILES

Joseph H. Brant and Rudolph Leonard Hasche, Kingsport, Tenn., assignors to Eastman Kodak Company, Rochester, N. Y., a corporation of New Jersey No Drawing. Application February 24, 1940, Serial No. 320,638

7 Claims. (Cl. 260—464)

This invention relates to the manufacture of vinyl compounds and more particularly to a novel method for the manufacture of various vinyl cyanides.

Certain vinyl compounds are known in the art and because such compounds may be polymerized or converted to compounds which form resins or other products, such materials have attracted interest. However, apparently few methods have been devised for the manufacture of vinyl cyanides. Ellis, in his book "The Chemistry of Synthetic Resins," vol. II, 1935, describes one method of preparing vinyl cyanide, which method comprises the reaction of acetylene and hydrogen cyanide. It is therefore apparent that the development of further and novel methods for producing vinyl compounds is a highly desirable result.

After considerable investigation, we have discovered a new reaction may be carried out in the vapor phase between certain nitriles or cyanides and formaldehyde to produce vinyl compounds. We believe this reaction to be novel in all respects as we have found no record in the art of vinyl cyanides having been prepared by a comparable reaction in the liquid phase. The reason for this probably resides in the fact that comparable reactions in the liquid phase would involve conditions favorable to the hydrolysis of cyanides. Hence, the production of such compounds would probably fail. Therefore, our discovery leads to a new synthesis of vinyl cyanides from readily available starting materials with high yields. The vinyl cyanides producible by our novel process will be recognized as those having the correct chemical structure for allowing subsequent polymerization or other treatment for the production of materials suitable for molding, extrusion or other industrial use.

This invention has for one object to provide a new method for the manufacture of vinyl compounds and particularly the manufacture of vinyl cyanides. Still another object is to provide a new method for the manufacture of the aforementioned compounds, which method permits the utilization of readily available starting materials. Still another object is to provide a new method for the manufacture of vinyl compounds, which method is relatively simple and efficient and gives good yields. A still further object is to provide a novel method particularly adapted for the production of vinyl cyanides of a type which may be readily converted to acids, esters, and even various amphoteric compounds. Still another object is to provide a novel catalytic method for the manufacture of vinyl cyanides wherein a variety of catalysts may be employed. Other objects will appear hereinafter.

Our novel reaction is comparable to some extent to the reaction described in our copending application 280,808 now Patent No. 2,245,567, patented June 17, 1941. In the present reaction a readily available aldehyde such as, for example, formaldehyde is employed. This formaldehyde may be obtained from various sources such as paraformaldehyde, formalin and the like. Preferably, we employ a 35%–40% formalin solution. The formalin is reacted with an alkyl cyanide, the reaction being carried out preferably with all of the components in the vapor stage during the reaction. This may be accomplished by vaporizing each of the reactants separately and mixing the vapors, or the reactants may be mixed in their existing state and subsequently vaporized before being subjected to reaction. The reaction is preferably carried out in a unit containing one or more of the catalysts hereinafter described in detail. Preferably, we would employ a temperature in the neighborhood of 280°–310° C. In general, we employ an excess of the organic cyanide for certain practical reasons relating to recovery and separation. That is, by using an excess of the organic cyanide, the aldehyde is practically all consumed in the reaction; hence, any procedure for the separation and recovery of unconverted aldehyde is minimized or eliminated. Therefore, in operating our process we contemplate employing an excess of one of the reactants, the return of certain of the components and the utilization of other steps to cause the complete consumption of the reaction in the aldehyde or such other components as it may be desired to increase the utilization of.

In carrying out our novel process various types of reaction apparatus may be employed. Our reaction may be carried out in apparatus such as described in Hasche et al. U. S. Patent No. 2,150,158.

In regard to the catalyst which may be used in our process, silica, alumina or other gel alone or in admixture with various materials, as described in U. S. Patent 2,150,158 may be employed.

By the term "gel" herein, we refer to any adsorptive type of catalyst comparable to the usual gels such as silica and alumina gel, irrespective of whether such material has gone through a gel state in its manufacture. At the present time there are available materials such as activated alumina and the like which we have found will function as a catalyst and are comparable in some respects to silica and alumina gel, but which materials have not passed through a gel stage in their manufacture.

We also may employ a catalyst such as described in U. S. Patent No. 2,245,567.

In more detail, examples of preparing satisfactory catalysts are as follows:

To 140 cc. water was added 60 cc. glacial acetic acid. This solution was heated to about 50–60° C. and 60 g. of lead monoxide (PbO) was dissolved therein by adding the lead oxide in small portions. To this lead acetate solution was added 500 g. silica gel. Any excess liquid was removed by heating the silica gel either under a partial vacuum or in a slow stream of air.

This dried catalyst was then divided into three equal parts of about 225 g. each. Sample No. 1 was used as prepared and designated a lead acetate catalyst.

To sample No. 2 was added 50 cc. of an aqueous solution containing about 10 g. chromium trioxide. This converted the lead acetate to lead chromate. The excess liquid was again removed by heating. This catalyst was designated a lead chromate catalyst.

The third portion was treated with an aqueous sulfuric acid solution containing sulfuric acid somewhat in excess of the amount required to convert the lead acetate to lead sulfate.

We have also prepared catalysts of the Zeolite type containing various metal oxides such as lead oxide, zinc oxide, cadmium oxide and the like as an integral part of the molecule. Certain pellet and screen type catalysts have also been found utilizable in our process. Preferably, however, we employ catalysts which are strictly a dehydration type of catalyst. For convenience of reference and description herein, we generically refer to our catalyst in such terms as "solid," "porous," "adsorptive," "dehydrated," and the like. It is apparent from the foregoing disclosure that we may employ a variety of different catalysts in our reaction, although as indicated for optimum results we prefer to employ a strictly dehydration type catalyst as exemplified by the gel type catalyst, the Zeolite type catalyst, impregnated or otherwise, various forms of lead salts, or admixtures of such catalysts either supported or unsupported. Any conventional catalyst support may be employed if it is desired to support our catalyst.

Further details respecting our invention will be apparent from the following examples which are set forth primarily for illustrating our preferred embodiments.

*Example I*

To 170 cc. of 35% formalin was added about 220 grams of the organic cyanide, ethyl cyanide. The mixture was vaporized and fed to a catalyst unit containing a dehydration type catalyst. The temperature was maintained as nearly as possible in the neighborhood of 295° C.–300° C. However, it is possible to operate at a range from about 175° C. to 400° C., although temperatures in excess of 225° are preferred. From this run was obtained about 400 cc. (380 grams) of a light brown condensate which separated into two layers when cooled. The ratio of these layers was about 5:1. The top layer contained the bulk of the vinyl cyanide which we were producing by the reaction.

From such a run we have found that 80–88% of the formaldehyde used was converted to alpha-methyl vinyl cyanide

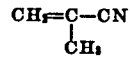

and thus 107–117 g. of the alpha methyl vinyl cyanide is obtained. This compound is a somewhat disagreeable smelling, water-white liquid boiling at 104°–105° C., at 735 mm. pressure. This vinyl cyanide may be further processed as will be apparent from the description hereinafter.

*Example II*

To about 170 cc. of a formalin solution was added about 82 grams of acetonitrile. The mixture was vaporized and fed to the catalyst unit containing dehydration catalyst, as indicated in the preceding example. Also, comparable temperatures were employed.

A space velocity of about 1500 has been found to be satisfactory, although slightly higher conversions may be obtained at lower rates. However, successful runs have been made at space velocities such as 4500. These space velocities were calculated at reaction temperature.

This run utilizing the organic cyanide, acetonitrile, yielded about 90 grams of the vinyl cyanide, acrylonitrile. This constituted a yield of approximately 85% based on the formaldehyde fed. The unreacted acetonitrile can readily be recovered in yields exceeding 98%. Hence, it is preferred to use an excess of such organic nitrile since as indicated above, by such procedure most, if not all, of the aldehyde will be consumed in the reaction. The acrylonitrile obtained in this example was a colorless liquid boiling at 78–80° C. at 750 mm. pressure.

*Example III*

To 170 cc. of formalin solution was added approximately 234 grams of the aromatic cyanide, benzyl cyanide. Sufficient methanol to make the solution homogeneous was added. This mixture was fed to a vaporizer and passed into the catalyst unit in a manner comparable to that already described. The temperature was kept between about 290° C. and about 310° C. A space velocity of 1000 was employed. In the treatment of such higher molecular weight aromatic cyanides, we have found that the catalytic activity may be somewhat lower. However, from this run we obtained 200 grams of benzyl vinyl cyanide. This amounted to a yield of approximately 75%, based on the formaldehyde consumed in the reaction.

The foregoing examples as indicated, have been set forth primarily for the purposes of illustration. Various other mixtures of formaldehyde from sources of formaldehyde such as formalin, paraformaldehyde, or other sources of aldehyde, may be reacted with various organic cyanides both aliphatic and aromatic. Still further examples of such organic cyanides are cyanoacetic acid, furfurylcyanide, nitroacetonitrile, allyl cyanide and orthochlorobenzyl cyanide.

Therefore, generically we may designate our cyanide compounds as R—CH$_2$CN, wherein R may represent any one of a variety of radicals such as: hydrogen, alkyl, heterocyclic, aryl and the like. In addition, by the foregoing terms we also embrace the substituted radicals as substituted alkyl, substituted aryl and the like.

These aliphatic and aromatic cyanides may be obtained from various sources or produced in a number of ways. For example, the ethyl cyanide of Example I is a readily available commercial compound. The acetonitrile may be obtained commercially and is producible by the reaction of

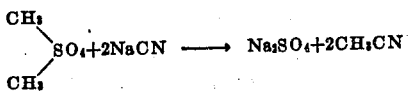

In general, the aromatic and/or heterocyclic cyanides used as starting materials in our process may be prepared by reacting benzyl chloride with sodium cyanide.

In the foregoing examples, wherein we have described premixing followed by vaporization, the individual components may be separately vaporized and mixed either prior to the entry or in the reaction chamber. From the use of methyl alcohol indicated in Example III, it is apparent that synthetic sources of formalin containing substantial contents of methanol may function satisfactorily in our process, and it is possible to add further methanol or other solvent for forming a suitable solution for vaporization in our process.

The vinyl cyanides produced in our process have considerable commercial value due to the fact that they may be hydrolyzed in acid media in the presence of a suitable solvent such as an alcohol to yield alpha-substituted acrylic esters. Our vinyl cyanides may also be converted to the corresponding acrylic acids. Or, if desired, the compounds may be polymerized and after polymerization the nitrile groups may be reduced forming polyamines. A still further reaction after polymerization is the partial reduction of the nitrile or cyanide groups or to amino groups followed by hydrolysis to the acid of a portion of the remaining unreduced cyanide or nitrile groups. This leads at once to the presence of an acid and amino group in the same molecule. This factor leads to an amphoteric molecule soluble in either acidic or basic solvents as well as in many neutral solvents such as acetone, dioxane and the like. The presence of acid and amino groups in a molecule makes possible further intermolecular reaction.

It is therefore apparent from the foregoing that our method of producing vinyl compounds may be varied in respect to catalyst use and in other respects. It is further apparent that the initial vinyl compounds produced in our process may be still further treated, as for example by partial or complete reduction to produce various other vinyl compounds, as for example vinyl compounds having amphoteric properties. Hence, it is apparent that our invention is susceptible of some modification; consequently, we do not wish to be restricted excepting insofar as is necessitated by the prior art and the spirit of the appended claims.

What we claim and desire to be secured by Letters Patent of the United States is:

1. A process for producing a vinyl cyanide which comprises passing the vapors of formaldehyde and an organic cyanide of the general formula $$R—CH_2—CN$$

wherein R is a radical selected from the group consisting of hydrogen, alkyl and aryl, into contact with a dehydration catalyst at a temperature between 175° C. and 400° C.

2. A process for producing a vinyl cyanide which comprises passing the vapors of formaldehyde and an alkyl cyanide of 1–3 carbon atoms having at least two hydrogen atoms on the carbon atom alpha to the cyano group into contact with a dehydration catalyst at a temperature between 175° C. and 400° C.

3. A process for producing vinyl cyanide which comprises passing the vapors of formaldehyde and acetonitrile into contact with a dehydration catalyst at a temperature between 175° C. and 400° C.

4. A process for producing alpha methyl vinyl cyanide which comprises passing the vapors of formaldehyde and ethyl cyanide into contact with a dehydration catalyst at a temperature between 175° C. and 400° C.

5. A process for producing a vinyl cyanide which comprises passing the vapors of formaldehyde and an organic cyanide of the general formula $$R—CH_2—CN$$

wherein R is an aryl group into contact with a dehydration catalyst at a temperature between 175° C. and 400° C.

6. A process for producing benzyl vinyl cyanide which comprises passing the vapors of formaldehyde and benzyl cyanide into contact with a dehydration catalyst at a temperature between 175° C. and 400° C.

7. The process of claim 1 in which the organic cyanide is present in an amount representing an excess over that required to react with the formaldehyde.

RUDOLPH LEONARD HASCHE.
JOSEPH H. BRANT.